US006370398B1

(12) United States Patent
Kanamaluru et al.

(10) Patent No.: US 6,370,398 B1
(45) Date of Patent: Apr. 9, 2002

(54) TRANSREFLECTOR ANTENNA FOR WIRELESS COMMUNICATION SYSTEM

(75) Inventors: Sridhar Kanamaluru, Northampton; Kenneth R. Wood, Hadley, both of MA (US)

(73) Assignee: Telaxis Communications Corporation, South Deerfield, MA (US)

( * ) Notice: Subject to any disclaimer, the term of this patent is extended or adjusted under 35 U.S.C. 154(b) by 0 days.

(21) Appl. No.: 09/317,767

(22) Filed: May 24, 1999

(51) Int. Cl.[7] .......................... G01S 13/00; H01Q 19/00

(52) U.S. Cl. ...................... 455/562; 455/269; 343/755; 343/761

(58) Field of Search ................................ 455/562, 269, 455/276.1, 277.1; 343/753, 755, 756, 757, 761

(56) References Cited

U.S. PATENT DOCUMENTS 4,185,287 A * 1/1980 Hubing et al. .............. 343/761
4,214,248 A * 7/1980 Cronson et al. ............ 343/756
6,014,108 A * 1/2000 Lynch et al. ................ 343/753

OTHER PUBLICATIONS

Millitech Corporation, "Crash Avoidance FLR Sensors," *Microwave Journal*, 37(7): 122–126 (1994).

* cited by examiner

*Primary Examiner*—Daniel Hunter
*Assistant Examiner*—Thuan T. Nguyen
(74) *Attorney, Agent, or Firm*—Hamilton. Brook, Smith & Reynolds, P.C.

(57) ABSTRACT

A compact lightweight antenna for receiving microwave direct line of sight wireless data signals used in services such as Local Multipoint Distribution Services (LMDS). The antenna provides for precise control over isolation of polarized signals. The antenna consists of an external parabolically shaped dome formed of a suitably resilient material such as thermoplastic. A polarizing metal grid is formed on the interior surface of the dome and serves as a transreflector for initially passing received radiation having a vertical polarization. A twist reflector disposed at a point along an axis defined by the metal grid reflects the received radiation, back in the direction of the transreflector with a different polarization. The now differently polarized energy is reflected by the parabolically shaped metal grid at a feed point located in the center of the twist plate. Operation for transmitting energy is analogous. The arrangement provides a minimum part count, low cost, low profile, easy to use antenna for line of sight full duplex microwave data applications.

19 Claims, 5 Drawing Sheets

TRANSREFLECTOR ANTENNA FOR WIRELESS COMMUNICATION SYSTEM

BACKGROUND OF THE INVENTION

There continues to be ever increasing demand for distributed high speed access to computer networks such as the Internet and private networks. Competition is fierce among various schemes which rely upon wires for physical layer connectivity, such as T1 carrier, Digital Subscriber Line (xDSL), cable modem, fiber optic distributed data interface (FDDI), and the like. However, it is readily apparent that wireless access systems continue to hold the promise of reducing network buildout costs, especially in areas where telephone, cable and/or fiber optic lines are not yet installed. Wireless systems almost always promise the most rapid and flexible deployment of access services and a quicker return on investment.

Certain radio frequency bands have been allocated in the United States and in other countries to provide so-called Local Multipoint Distribution Service (LMDS). LMDS uses super high frequency microwave signals in the 28 or 40 gigahertz (GHz) band to send and receive broadband data signals within a given area, or cell, approximately up to six miles in diameter. On the surface, LMDS systems work in a manner analogous to that of narrow band cellular telephone systems. In the typical LMDS system, a hub transceiver services several different subscriber locations. The antenna at the hub has a wide viewing angle to allow access by multiple subscribers that use individual narrowly focused subscriber antennas. A high speed data communication service is provided by deploying appropriate modem equipment at both the hub and subscriber locations. Depending upon the particular modems used, the services provided to each subscriber can be, for example, a point-to-point dedicated service.

This type of service can compete directly with wired services available from telephone companies and cable company networks. However, the designers of LMDS systems are faced with several challenges at the present time. Because such systems send very high frequency radio signals over short line-of-sight distances, cell layout has proven to be a complex issue. Some factors that must be considered in cell site design are line of sight, analog versus digital modulation, overlapping cells versus single transmitter cells, transmit and receive antenna height, foliage density, and expected rainfall. The configuration of antennas and transceivers at a hub site determines the specific coverage of the different sectors within a cell. Antennas with wide viewing angles result in fewer sectors at each cell site. Narrow sectors can be established, but narrower sectors require more hub equipment to cover the same field of view. Also, narrow sectors using the same polarization increase the amount of interference from one hub to the other. Wireless communication system designers can overcome this limitation by using polarization diversity at a cell site. In one approach, narrow sectors using orthogonal polarizations (i.e., the signals radiated from two hubs are 90 degrees to one another) are interleaved to reduce the interference. This polarization diversity can be achieved using orthogonally polarized antennas with very low cross-polarization levels. However, the design of antennas with low cross-polarization levels throughout the sector remains a challenge.

Another challenge is in the electronics technology needed to implement the service. For example, transmitter amplifiers for such high frequency systems require sophisticated semiconductor technology such as using monolithic millimeter-wave integrated circuits (MMICs) based on gallium arsenide technologies. These MMICs generate considerable heat in the transceiver unit and the heat needs to be dissipated by careful design of the heat sink of the transceiver. Furthermore, transceiver systems must provide precise control over signal levels in order to affect the maximum possible link margin at the receiver.

One overriding concern with LMDS services is that they are fixed services and therefore have certain properties that are dramatically different than for mobile services. One difference in particular is that LMDS service is completely line of sight, meaning that a clear path for signal propagation between the hub and subscriber is an absolute requirement. Locations without direct line of sight access typically require auxiliary reflectors and/or amplifiers, if they can be made to work at all.

Another consideration in an LMDS system is that connection is expected to be full duplex, in the sense that the transmitter is expected to operate at the same time as the receiver, with minimal interference being generated between them. Thus, broadband communication systems such as LMDS require a highly directional (i.e., narrowly focused) antenna that has very low cross-polarization levels throughout the viewing area. Also, since these transceiver equipments are used for subscriber units, these need to be small, compact and should fit in with the decor of the subscriber dwellings. An additional advantage would be provided if some type of heat dissipation capability was also provisioned for the unit.

Certain compact microwave and millimeter-wave radars operating at extremely high frequencies have been developed using a folded folding optics design. Such a design uses an external lens for focusing electromagnetic radiation to define an antenna axis. A separate transreflector placed in a plane orthogonal to the axis of the lens and a separate twist reflector assembly is also placed in the same plane. Such assemblies typically require fabrication of multiple individual components. See, for example, the antennas described in U.S. Pat. No. 5,455,589 issued to Huguenin, G. R. and Moore, E. L. on Oct. 3, 1995 and assigned to Millitech Corporation, the Assignee of the present application, as well as U.S. Pat. No. 5,680,139 issued on Oct. 21, 1997 to the same inventors, and also assigned to Millitech Corporation.

SUMMARY OF THE INVENTION

Briefly, the present invention is a compact, lightweight, inexpensive antenna for use with wireless communication services including, but not limited to, line of sight microwave frequency services such as Local Multipoint Distribution Services (LMDS). The antenna provides for transmission and reception on a vertical and/or horizontal plane as well as isolation for cross-polarized components. The design provides for precise control over isolation and polarization characteristics.

More particularly, the antenna consists of an exterior shaped housing, or dome, formed of a suitable inexpensive resilient material such as plastic. A polarizing metal grid is formed on an interior facing surface of the dome.

The dome is spaced apart from a twist reflector formed of a metal plate in one embodiment. Grooves are cut in the surface of the twist plate facing the polarizing grid. In another embodiment, the twist reflector is made of a metal backed dielectric layer of a thickness approximately equal to one-quarter wavelength at the frequency of operation, in the dielectric medium. A thin metal grid is formed on the dielectric layer, facing the dome surface of the transreflector. Thus, in general, twist reflectors can be constructed in many different ways, the intent in all cases being to achieve a 90 degree rotation of polarization between incident and reflected signals.

A waveguide feed is placed preferably in the center of the twist reflector in either embodiment to provide for bidirectional signal coupling between the antenna and transceiving equipment.

In operation, in the receive direction, microwave line of sight signals are received at the dome and only those with a desired polarization pass through the polarizing grid. Signals of an orthogonal polarization are reflected away from the dome, thereby providing very low cross-polarization levels. The twist reflector then reflects such signals back towards the dome and the grid. In this instance, the twist reflector imparts a rotation, such as 90 degrees, to this reflected energy. When the reflected energy reaches the polarizing grid a second time, it is reflected. Since the dome and hence the polarizing grid are of a shape which focuses reflected energy, such as parabolic or spherical, the energy reflected by the grid is focused at a point in the center of the twist reflector at which the waveguide feed is placed.

The transreflector arrangement operates analogously in the transmit direction. That is, transmit signal energy in all directions exiting the waveguide is directed to the polarizing grid. The grid in turn reflects such energy along its parabolic shape back to the twist plate, essentially with all rays in parallel. The twist plate imparts a 90 degree rotation to this energy and reflects it back to the metal grid. Now having the opposite polarization, the transmit energy passes through the grid and out along a line of sight defined by the axis.

The exterior dome serves not only as a support base for the polarizing grid, but also as a casement for the components contained within the antenna.

Advantageously, the twist plate may be integrally formed on the outer surface of a metal enclosure within which are placed the transceiver circuits, modem interface circuits, and the like. In this instance, the metallic twist plate may also serve as a heat sink, dissipating the heat generated by the operating transceiver electronic modules.

This arrangement provides a low cost, minimum part count, low profile, easy to manufacture antenna for use in line of sight, full duplex microwave signaling applications.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
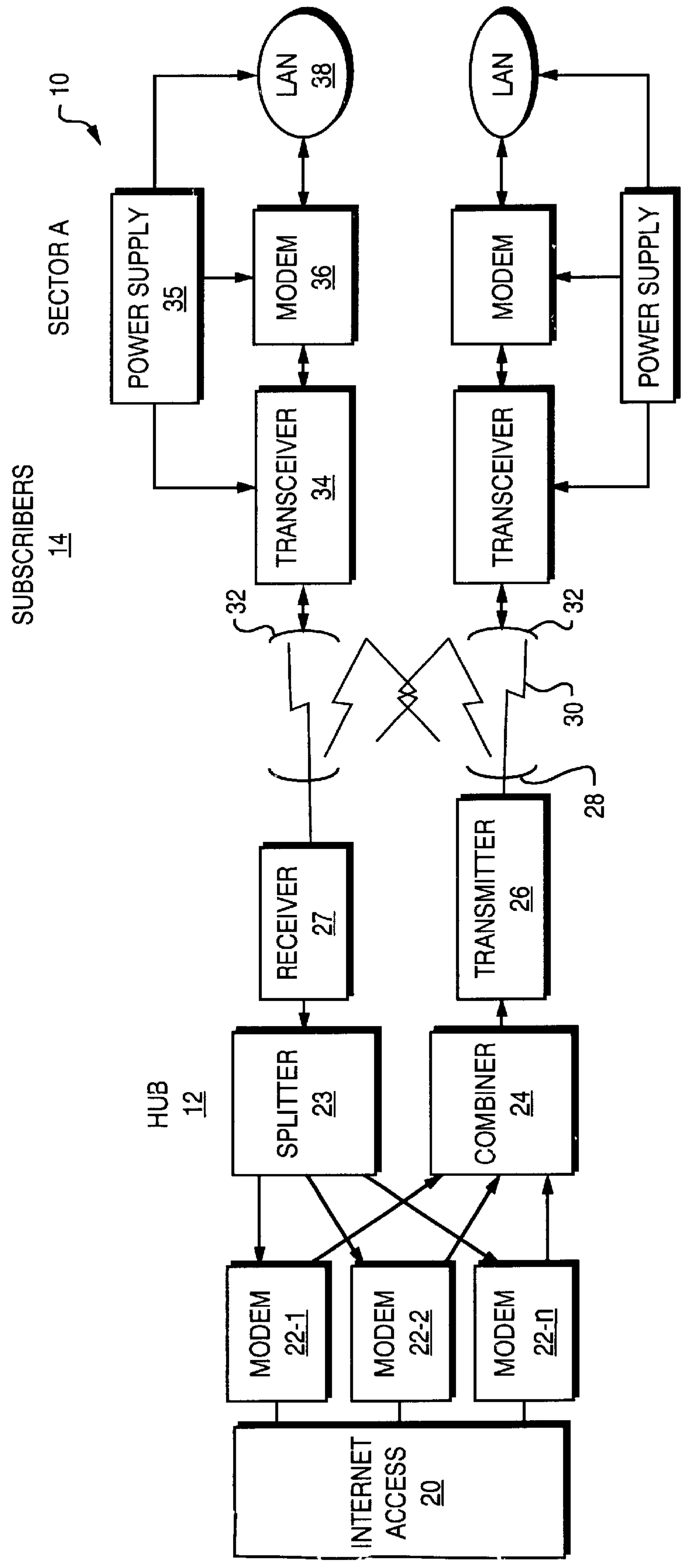
FIG. 1 is a block diagram of a Local Multipoint Distribution Service (LMDS) system which uses a compact antenna assembly according to the invention.

FIG. 1 is a block diagram of a system 10 for providing a high speed direct line of sight wireless data service such as Local Multipoint Distribution Service (LMDS) using millimeter-wave frequency radio signals for a physical layer medium. The system 10 consists of equipment at a hub location 12 as well as equipment at multiple subscriber locations 14. It should be understood that the subscriber units 14 may individually be located in a particular sector of a cell to provide support for a greater number of subscribers within a given cell using a limited number of carrier frequencies. In the illustrated system 10, multiple subscribers are provided with a high speed data service to provide access to the Internet.

The equipment at the hub 12 consists of a connection to a point-of-presence (POP) into the network or other Internet access device 20, and multiple modems 22-1, 22-2, 22-n. In the transmit (e.g., forward link) direction, the modems 22 convert baseband digital signals to modulated radio frequency signals using digitization and modulation schemes appropriate for line of sight microwave transmission. For example, the point-to-point (PTP) class of modems available for purchase from Integrity Communications, Inc. of Richmond, Va. provide data links that operate at full duplex speeds up to 10 megabits per second (Mbps).

Continuing in the transmit direction, the modulated signals representing multiple transmit signals provided by the modems 22 are fed through an RF combiner 24 to a microwave frequency transmitter 26. The microwave signals produced by the transmitter are then fed to a hub antenna 28 which then forwards them over multiple forward radio links 30 to subscriber locations 14.

At the subscriber locations 14, a subscriber antenna 32 receives the line of sight microwave signals. The subscriber antenna 32 is the particular focus of the present invention and will be described in greater detail below. The subscriber antenna 32 receives the microwave frequency signals and forwards them to a subscriber transceiver 34. A power supply 35 feeds power to the subscriber transceiver 34, modem 36, and local area network (LAN) 38. A modem 36 converts the signals back to an appropriate digital form suitable for transmission over a local area network (LAN) 38 to which computing equipment may be connected in a well known manner.

Operation in the reverse link direction is analogous. Signals originating at the subscriber site 14 are received over the LAN 38 by the modems 36 and fed to the transceivers 34. The subscriber antenna 32 in turn couples these over the radio links 30 to the hub location 12, at which point the receiver 27 and splitter 23 provide multiple signals to the receiver portions of the modems 22.

Figure 2:
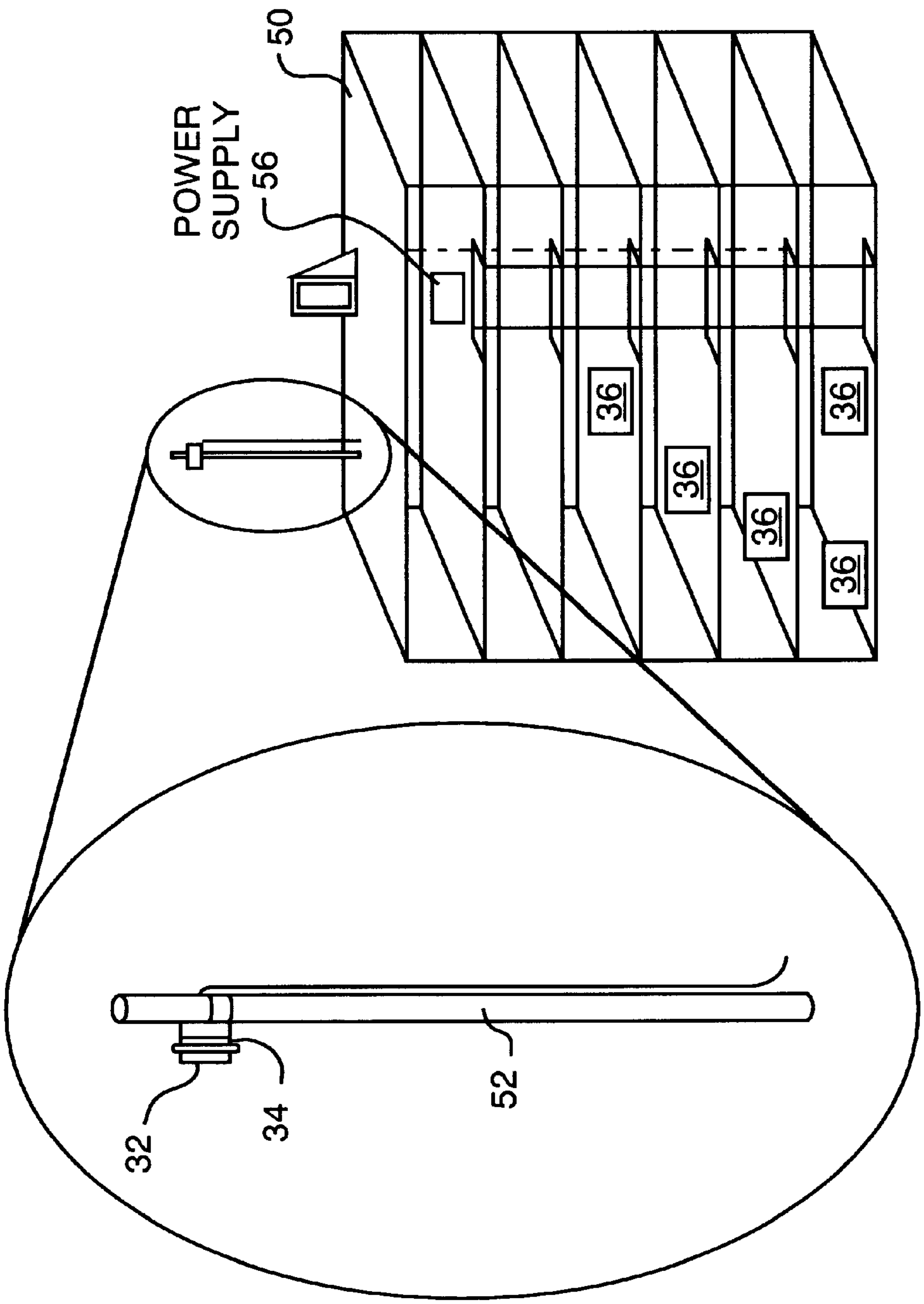
FIG. 2 illustrates a typical installation of the antenna assembly at a subscriber location such as on the roof of a building.

Of particular interest to the present invention are the antenna 32 and transceiving equipment 34 used at the subscriber location 14. As shown in FIG. 2, such an antenna 32 is typically arranged at a building site 50. The antenna 32 may be mounted to a mast 52 located on the roof of the building 50, and a transceiver 34 may be located within the equipment mounted on the mast 50. In this instance, a single coaxial cable 56 may be run from the transceiver 34 down the mast 52 to provide radio frequency and power connections to the multiple modems 36 distributed throughout the building 50. Care is taken to keep the radio frequency link power budget for the multiple modems within the overall power and modulation budgets of the transceiver pairs 34 and 26.

Figure 3:
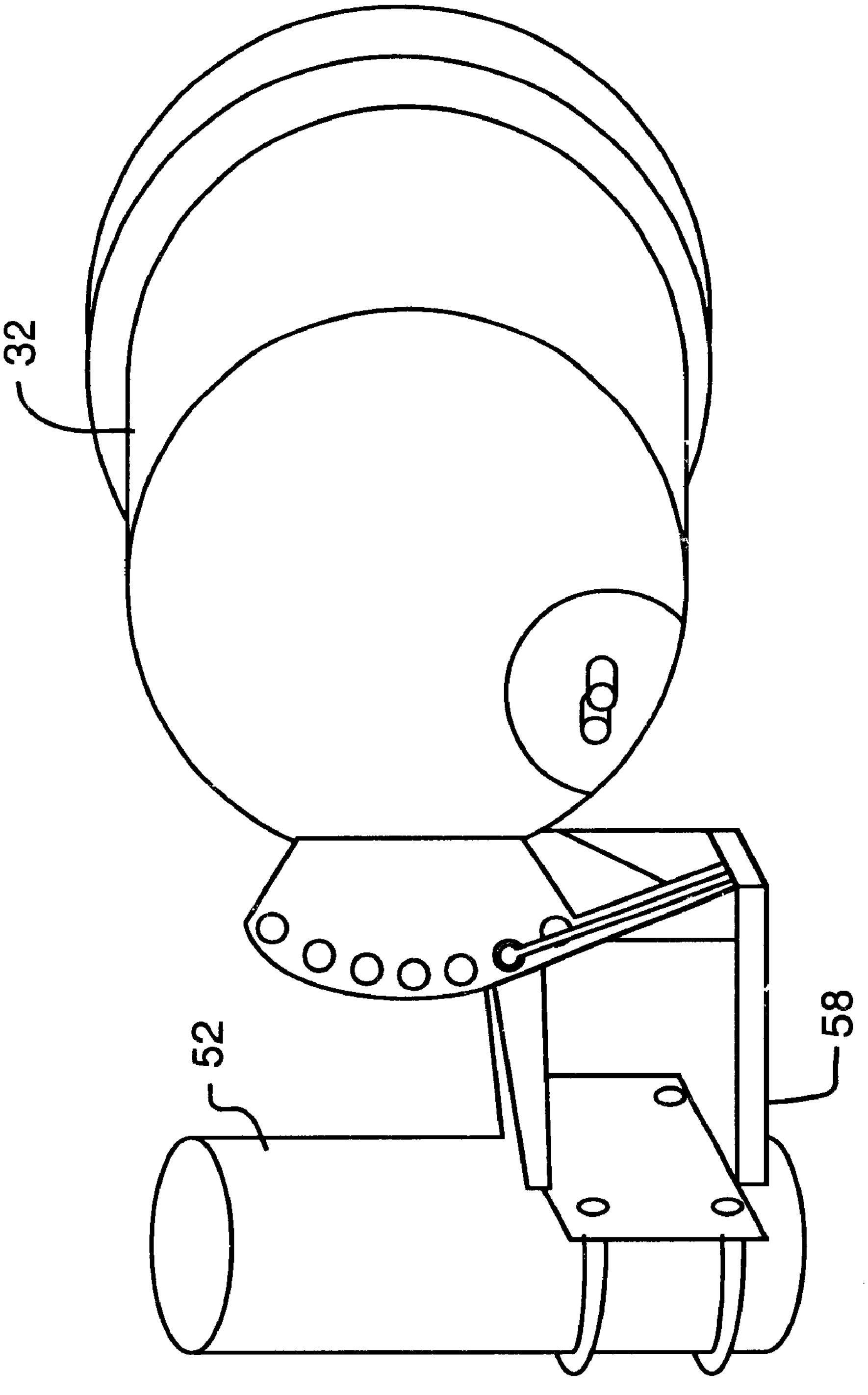
FIG. 3 is a more detailed view of the antenna assembly as mounted to a mast.

As shown in FIG. 3, the antenna assembly 32 may be mounted to the mast 52 by suitable mounting bracket 58. The antenna assembly 32 is carefully aimed at the time of installation to provide the required line of sight to the antenna 28 associated with the hub 12.

Figure 4:
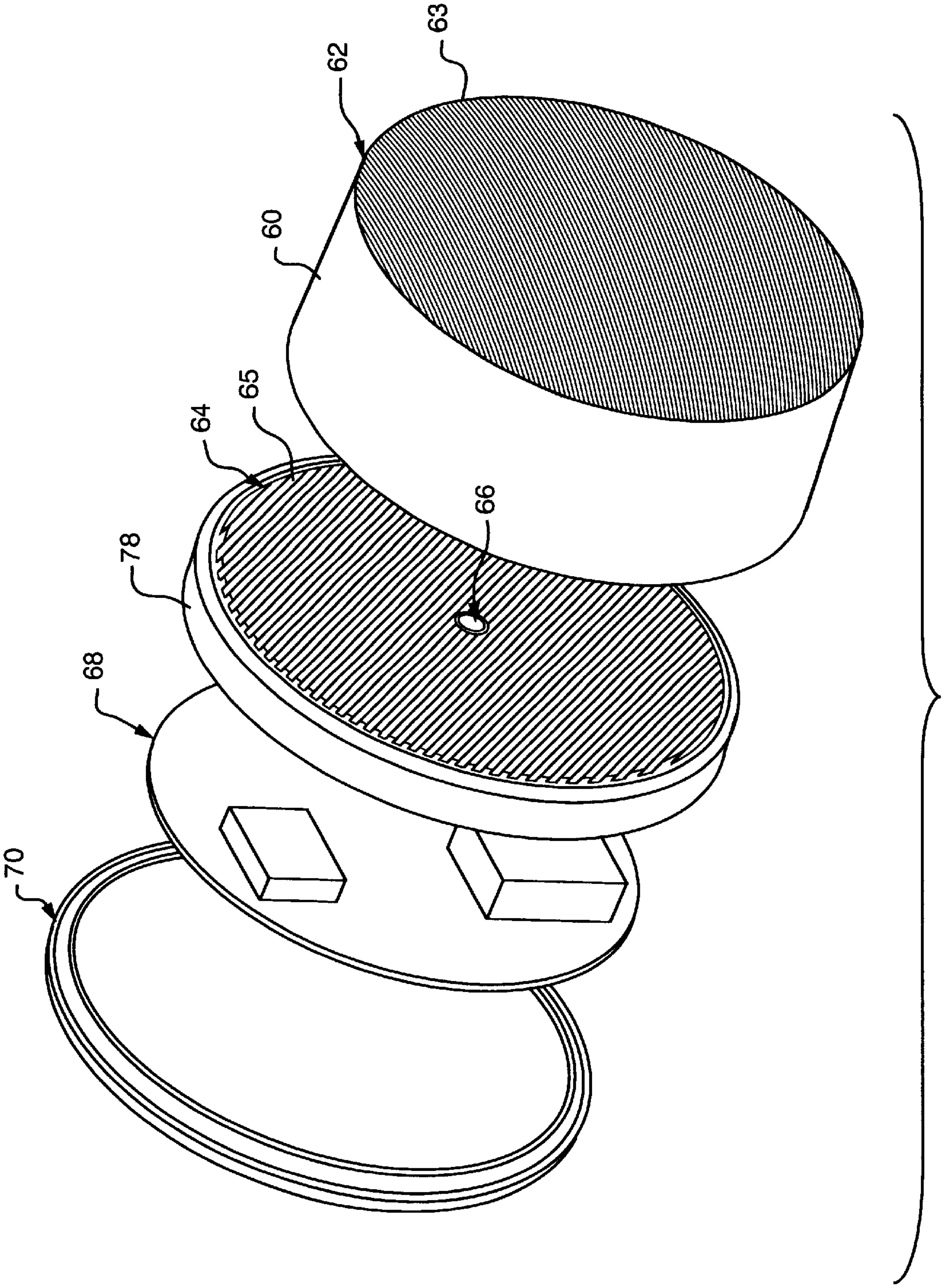
FIG. 4 is an exploded view of the various components of the antenna assembly.

FIG. 4 is a more detailed view of certain portions of the antenna assembly 32. In particular, the antenna assembly 32 consists of a housing 60 formed of an appropriate suitable material such as an ABS thermoplastic. The housing 60 has an outer portion thereof shaped as a thin plastic dome 62 having an approximately parabolic shape in the preferred embodiment. An alternate shape for the outer portion is spherical. As will be described in more detail later on, the dome 62 has formed, on an interior surface thereof, a parallel wire grid 63. In a preferred embodiment, the thickness of the dome is approximately one-half the wavelength of the frequency of operation within the dielectric material of the dome 62.

A second component of the antenna 32 is a twist reflector or plate 64. The twist plate imparts a 90 degree rotation in the polarization of the incident and reflected signals, and can be designed in many ways. In the present embodiment, the metal twist plate 64 has formed therein a grooved conductive surface 65 facing the interior of the housing 60. In particular, the groove surface 65 faces the parallel wire grid 63 formed on the interior of the parabolic surface 62. A circular waveguide feed 66 is placed in preferably the center of the twist plate 64. The waveguide feed 66 serves as a focal point for received radiated energy and as a feed point for transmitted radiated energy.

In another embodiment, the twist plate is made of a metal backed dielectric layer of a thickness approximately equal to one-quarter wavelength at the frequency of operation, in the dielectric medium. A thin metal grid is formed on the dielectric layer, facing the dome surface of the transreflector. Thus, in general, twist reflectors can be constructed in many different ways, the intent in all cases being to achieve a 90 degree rotation of polarization between incident and reflected signals.

The twist reflector 64 with waveguide feed 66 typically has mounted on the rear surface thereof a printed wiring board 68 on which are placed the components of the transceiver 34. A rear cover 70 serves as both a conductive shield against interfering electromagnetic radiation and as a shield against the weather and other physical elements.

The dome 62 and more specifically the grid 63 define a center axis 72 of the antenna. The twist plate 64 is arranged so that its center point is located along the same axis 72. The axis 72 defines the direction in which the antenna 32 transmits and from which it receives electromagnetic radiation.

Figure 5:
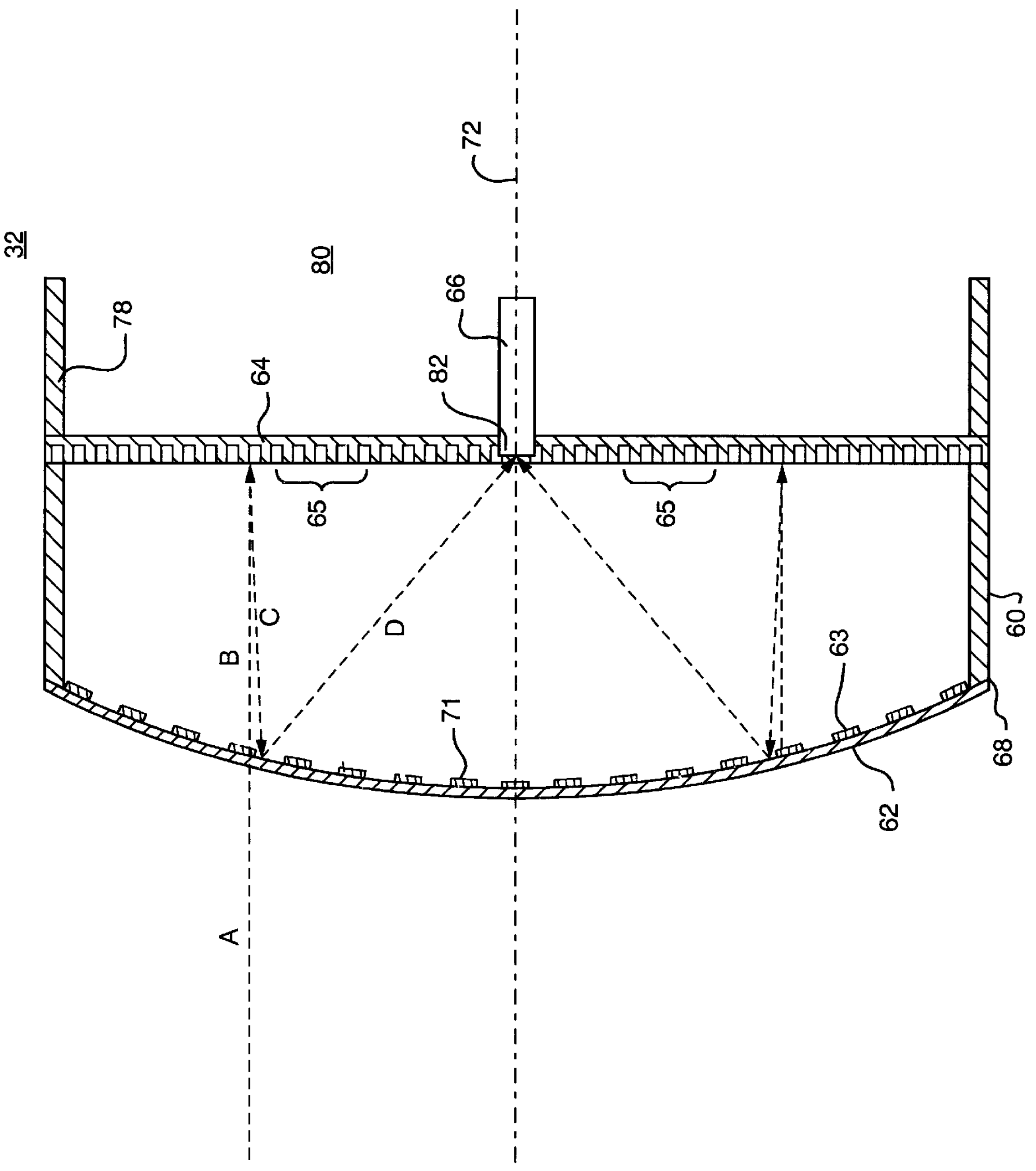
FIG. 5 is a cross-sectional view of the assembled antenna useful for understanding of how the antenna works.

FIG. 5 is a cross sectional view of the antenna 32 which will be used in describing the operation of the antenna 32 in greater detail. As previously mentioned, the parabolic surface 62 and in particular the parallel strip metal grid 63 serve not only a transreflector but also as a type of lens or focusing element. For example, in a receive mode, as energy arrives at the antenna assembly 32, it first passes directly through the plastic dome 62, reaching the metal grid 63. The dashed line labeled "A" serves to indicate generally the direction of received radiation. If the individual parallel wires 71 of the grid 63 are oriented in a horizontal direction, as shown in the sketch, the only energy proceeding to point B along the axis 72 will be vertically polarized energy.

This vertically polarized energy then reaches the twist plate 64 and, in particular, the parallel slot pattern 65 formed thereon. The twist plate 64 is positioned with respect to the dome 62 so that the slot pattern 65 is oriented with a 45 degree angle with respect to the polarizing metal grid 63. This 45 degree offset to the incoming vertically polarized radiation not only reflects the incident radiation in the general direction of the arrows C, but also imparts a 90 degree rotation to its polarization. The reflected energy is now horizontally polarized.

When the now horizontally polarized energy reaches the surface of the polarizing grid 63 a second time, the energy is reflected since it is of the same orientation as the wire grid 63. Since the grid 63 is shaped in a parabolic form, assuming rays entering the antenna 32 are in parallel, the resulting reflected energy generally travels in the direction of arrows D, and is focused at the waveguide feed 66 placed in the center of the twist plate 64.

The transreflector 68 and in particular the curvature of the wire grid 63 is preferably parabolic as previously mentioned. The parabola has a normal equation which may be represented as $$Y^2=4fx$$

where f is the desired focal length of the antenna, and x is the direction normal to the transreflector plane. That is, x is the distance in the direction of the horizontal line 72 formed between the center line of the twist plate 64 and transreflector 68, and measured from the center of the transreflector 68. The distance between the transreflector 68 and twist plate 64 may be fairly small or up to the focal length of the parabola of the dome 62.

The amount of isolation provided by the grid 63 with respect to other polarizations is a function of the spacing of the grid 63 and the density of the individual grid wires 71. The grid 63 must have sufficient density in that the number of wires 71 for a given unit wavelength are needed to provide a certain desired amount of isolation. One rule of thumb which has been found to be particularly useful in practice is that ten grid wires 71 and the associated ten spacings should be provided along a distance equivalent to the operating wavelength. Providing fewer grid lines per unit spacing makes the antenna 32 easier to manufacture; however, having more grid lines per unit spacing provides higher isolation. The wire 71 grid spacing in the typical embodiment for use at LMDS frequencies would be approximately 0.5 to 1 millimeters (mm).

The precise dimensions of the grooves 65 in the twist plate 64 also depend upon the precise frequency of operation. The depth of the individual slots is typically selected to be approximately one-quarter of the operating wavelength. The width of each slot, and correspondingly the number of the resulting ridges 74 per unit spacing is a practical consideration depending upon fabrication requirements. For operation at LMDS frequencies, it is preferable to try to keep approximately three slots per is operating wavelength. With the indicated dimensions and numbers of slots, it is possible to obtain 40 decibels (dB) of isolation or more.

The twist plate 64 is preferably also integrally formed with a rearward facing rim 78 such that an enclosure 80 is provided for placement of the printed wiring board 68 (not shown in FIG. 5). This permits the twist reflector 64 to be integrally molded into the same casting which is used to house the electronics. This design approach further minimizes the number of individual component parts of the antenna assembly 32.

Because the antenna is sensitive to polarized energy, it may be conveniently used in an environment where the forward and reverse link signals for different subscribers 14 have different polarizations. For example, transceivers operating in adjacent sectors from the same hub may have different polarizations. Subscribers 14 located close enough to one another to be in the same line of sight with the cell site having hub antennas with orthogonal polarizations may orient their subscriber antenna assembly 32 differently, to effect greater isolation between them, or even to permit two subscribers 14 to use identical carrier frequencies.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An antenna for use in a wireless communication system, the antenna comprising:

a housing having a dome shaped exterior portion thereof;

a focusing transreflector consisting of a wire grid disposed along a surface of the dome and further defining an axis for the antenna, the orientation of the wire grid such that radiation having a particular polarization passes through the wire grid and radiation of other polarizations is reflected by the wire grid; and a twist reflector substantially centered along the axis and located at a distance away from the transreflector such that the twist reflector reflects received radiation back towards the focusing transreflector and imparts a polarization to the received radiation thereby reflected so that the focusing transreflector causes the reflected and polarized radiation to be focused along the axis.

2. An antenna as in claim 1 wherein the wire grid is formed on an interior surface of the dome.

3. An antenna as in claim 1 wherein the wire grid is formed of a plurality of parallel wires with a spacing approximately equal to one-tenth of the wavelength of a carrier frequency used in the wireless communication system.

4. An antenna as in claim 1 wherein the twist reflector further comprises:

a metal plate having grooves formed in a surface facing the wire grid.

5. An antenna as in claim 4 wherein the grooves formed in the metal plate have a depth of about one-quarter of the wavelength of a carrier frequency used in the wireless communication system.

6. An antenna as in claim 4 wherein approximately three grooves are formed in the twist plate per wavelength of a carrier frequency used in the wireless communication system.

7. An antenna as in claim 1 wherein the twist reflector further comprises:

a metal-backed dielectric layer.

8. An antenna as in claim 1 wherein the twist reflector is additionally formed on an external face of a housing in which are enclosed a radio transceiver for receiving microwave data signals on a carrier frequency.

9. An antenna as in claim 8 wherein the twist reflector further serves as a heat sink for electronic components of the radio transceiver.

10. An antenna as in claim 1 wherein a feed point is disposed at the twist reflector along the axis of reception.

11. A subscriber unit for use in a Local Multipoint Distribution Service wireless data communication system using microwave radio carrier frequencies, the subscriber unit comprising:

an antenna additionally including:

a housing having a dome shaped exterior portion thereof;

a focusing transreflector consisting of a wire grid disposed along a surface of the dome and further defining an axis for the antenna, the orientation of the wire grid such that radiation having a particular polarization passes through the wire grid and radiation of other polarizations is reflected by the wire grid;

a twist reflector substantially centered along the axis and located at a distance away from the transreflector such that the twist reflector reflects received radiation back towards the focusing transreflector and imparts a polarization to the received radiation thereby reflected so that the focusing transreflector causes the reflected and polarized radiation to be focused along the axis;

a feed point disposed at the twist reflector along the axis, and arranged to couple transmit energy to the antenna and to couple receive energy from the antenna;

a microwave transceiver, arranged to couple microwave modulated transmit signals and receive signals to the antenna through the feed point; and a modem, arranged to provide modulated data signals to the transceiver, and to provide demodulated data signals at an output thereof.

12. A subscriber unit as in claim 11 wherein the wire grid is formed of a plurality of parallel wires with a spacing approximately equal to one-tenth of the wavelength of the microwave carrier frequency.

13. A subscriber unit as in claim 11 wherein the twist reflector further comprises:

a metal plate having grooves formed in a surface facing the wire grid.

14. A subscriber unit as in claim 13 wherein the grooves formed in the twist plate have a depth of about one-quarter of the wavelength of the microwave carrier frequency.

15. A subscriber unit as in claim 13 wherein approximately three grooves are formed in the twist plate per wavelength of the microwave carrier frequency.

16. A subscriber unit as in claim 11 wherein the twist reflector further comprises a mental backed dielectric layer.

17. A subscriber unit as in claim 11 wherein the twist reflector is additionally formed on an external face of a housing in which are enclosed a radio transceiver for receiving microwave data signals on the microwave carrier frequency.

18. A subscriber unit as in claim 17 wherein the twist reflector further serves as a heat sink for electronic components of the transceiver.

19. A subscriber unit as in claim 11 wherein the feed point is disposed at the twist reflector along the axis of reception.

* * * * *

UNITED STATES PATENT AND TRADEMARK OFFICE

CERTIFICATE OF CORRECTION

PATENT NO. : 6,370,398 B1
DATED : April 9, 2002
INVENTOR(S) : Sridhar Kanamaluru and Kenneth R. Wood.

It is certified that error appears in the above-identified patent and that said Letters Patent is hereby corrected as shown below:

Column 8,
Line 50, delete "mental" and insert -- metal --.

Signed and Sealed this

Thirtieth Day of July, 2002

*Attest:*

JAMES E. ROGAN

*Attesting Officer*

*Director of the United States Patent and Trademark Office*